United States Patent
Nakamura et al.

(10) Patent No.: US 7,997,097 B2
(45) Date of Patent: Aug. 16, 2011

(54) AIR CONDITIONER

(75) Inventors: Yoshiro Nakamura, Fuji (JP); Kiyotaka Ueno, Fuji (JP)

(73) Assignee: Toshiba Carrier Corporation, Tokyo (JP)

( * ) Notice: Subject to any disclaimer, the term of this patent is extended or adjusted under 35 U.S.C. 154(b) by 109 days.

(21) Appl. No.: 12/256,505

(22) Filed: Oct. 23, 2008

(65) Prior Publication Data
US 2009/0120112 A1 May 14, 2009

Related U.S. Application Data

(63) Continuation of application No. PCT/JP2007/059102, filed on Apr. 26, 2007.

(30) Foreign Application Priority Data

Apr. 26, 2006 (JP) ................. 2006-122482

(51) Int. Cl.
*F25B 1/00* (2006.01)
*F25B 41/00* (2006.01)
*F25B 49/00* (2006.01)

(52) U.S. Cl. .................. 62/228.1; 62/196.1; 62/126

(58) Field of Classification Search .......... 62/228.1, 62/196.1, 228.3, 115, 126, 129, 498
See application file for complete search history.

(56) References Cited

FOREIGN PATENT DOCUMENTS

| JP | 1-155153 | 6/1989 |
| JP | 01155153 A * | 6/1989 |
| JP | 06-229631 | 8/1994 |
| JP | 08-178450 | 7/1996 |
| JP | 08-193763 | 7/1996 |
| JP | 8-313067 | 11/1996 |
| JP | 09119693 A * | 5/1997 |
| JP | 2003-222394 | 8/2003 |
| JP | 2005-61738 | 3/2005 |
| JP | 2005061738 A * | 3/2005 |
| JP | 2005083704 A * | 3/2005 |

OTHER PUBLICATIONS

International Preliminary Report on Patentability issued in Application No. PCT/JP07/059,102, mailed Nov. 27, 2008.
International Search Report of PCT/JP2007/059102.
English language translation of JP-2005-61738.
English abstract of JP-01-155153.
English language translation of JP-2003-222394.
English Language Translation of Office Action issued in Chinese Appl 2007800151832 on Sep. 18, 2009.
Office Action issued in Chinese Appl 2007800151832 on Sep. 18, 2009.
English Language Abstract of JP 08-313067 published Nov. 29, 1996.
English Language Translation of JP 08-313067 published Nov. 29, 1996.

(Continued)

*Primary Examiner* — Chen-Wen Jiang
(74) *Attorney, Agent, or Firm* — DLA Piper LLP US

(57) ABSTRACT

An air conditioner according to an embodiment of the invention includes a refrigerator cycle unit having a variable speed compressor, an outdoor heat exchanger, a decompression device, an indoor heat exchanger, and an accumulator sequentially connected to one another, a bypass pipe that connects the discharge side of the compressor and an outlet of the accumulator and has a two-way valve in the middle thereof, a discharge temperature sensor that detects the temperature of the compressor, and a controller that opens or closes the two-way valve, and limits the number of rotations of the compressor to a predetermined value or less, on the basis of the temperature detected by the discharge temperature sensor when the compressor starts.

4 Claims, 7 Drawing Sheets

OTHER PUBLICATIONS

Japanese Office Action issued in JP 2008-513269 mailed Jan. 18, 2011.
English Translation of Japanese Office Action issued in JP 2008-513269 mailed Jan. 18, 2011.
English Language Abstract of JP 2005-061738 published Oct. 3, 2005.
English Language Abstract of JP 06-229631 published Aug. 19, 1994.
English Language Translation of JP 06-229631 published Aug. 19, 1994.
English Language Abstract of JP 08-178450 published Jul. 12, 1996.
English Language Translation of JP 08-178450 published Jul. 12, 1996.
English Language Abstract of JP 08-193763 published Jul. 30, 1996.
English Language Translation of JP 08-193763 published Jul. 30, 1996.

* cited by examiner

AIR CONDITIONER

CROSS REFERENCE TO RELATED APPLICATIONS

This is a Continuation Application of PCT Application No. PCT/JP2007/059102, filed Apr. 26, 2007, which was published under PCT Article 21(2) in Japanese.

This application is based upon and claims the benefit of priority from prior Japanese Patent Application No. 2006-122482, filed Apr. 26, 2006, the entire contents of which are incorporated herein by reference.

BACKGROUND OF THE INVENTION

1. Field of the Invention

The present invention relates to an air conditioner, and more particularly, to an air conditioner capable of preventing the dilution of a refrigerator oil of a compressor provided in an outdoor unit.

2. Description of the Related Art

In order to prevent the discharge of a refrigerator oil during a flooding operation of a compressor and achieve a rapid operation corresponding to a load, an air conditioner has been proposed which is provided with a bypass pipe that connects the discharge side and the suction side of the compressor and has a two-way valve in the middle thereof (for example, see Jpn. Pat. Appln. KOKAI Publication No. 2005-61738). In such an air conditioner, after the air conditioner starts up, a low-frequency operation time during the first startup of a compressor is set to be longer than that of a normal operation. In addition, a two-way valve is opened for a predetermined amount of time during the first startup of the compressor, and the compressor is operated for a long time at a low frequency at the first startup. This prevents the discharge of a refrigerator oil during startup, and a portion of the discharged refrigerator oil returns to the compressor. At or after the second startup, the low-frequency operation time is shortened to rapidly perform a necessary operation.

BRIEF SUMMARY OF THE INVENTION

The above-mentioned air conditioner has the following problems. After the startup of the air conditioner, when the stagnation of a refrigerant is dissolved and the two-way valve is closed, a large amount of refrigerant stored in the accumulator flows into the compressor and the dilution of the refrigerator oil is likely to occur.

Accordingly, an object of the invention is to provide an air conditioner capable of preventing the dilution of a refrigerator oil due to the inflow of a large amount of refrigerant stored in an accumulator to a compressor.

In order to achieve the object, an air conditioner according to an embodiment of the invention has the following structure.

It comprises: a variable speed compressor; a four-way valve; an outdoor heat exchanger; a decompression device; an indoor heat exchanger; an accumulator; a bypass pipe which connects a discharge side of the compressor and an outlet of the accumulator and has a two-way valve therein; compressor temperature sensor constructed and arranged to detect the temperature of the compressor; and a controller constructed and arranged to open the two-way valve and gradually limit the maximum operating frequency of the compressor on the basis of the temperature detected by the compressor temperature sensor, when the temperature detected by the compressor temperature detecting means is less than or equal to a first determination temperature at the time of the startup of the compressor after the air conditioner is operated, and close the two-way valve when the temperature detected by the compressor temperature sensor is greater than or equal to a second determination temperature, wherein the variable speed compressor, the four-way valve, the outdoor heat exchanger, the decompression device, the indoor heat exchanger, and the accumulator are connected to one another in a ring shape.

DETAILED DESCRIPTION OF THE INVENTION

Figure 1:
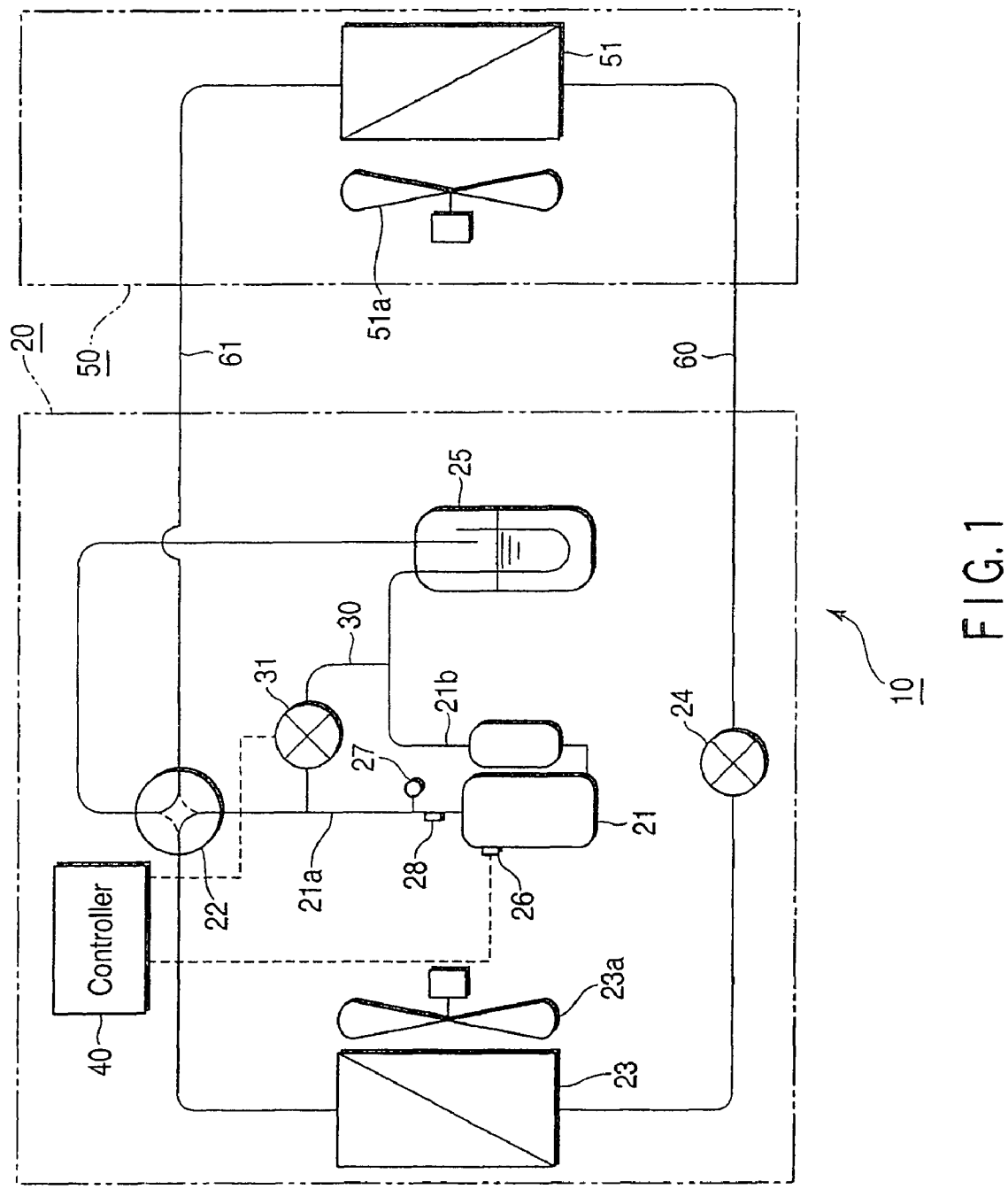
FIG. 1 is a block diagram illustrating the structure of an air conditioner according to a first embodiment of the invention.
Figure 2:
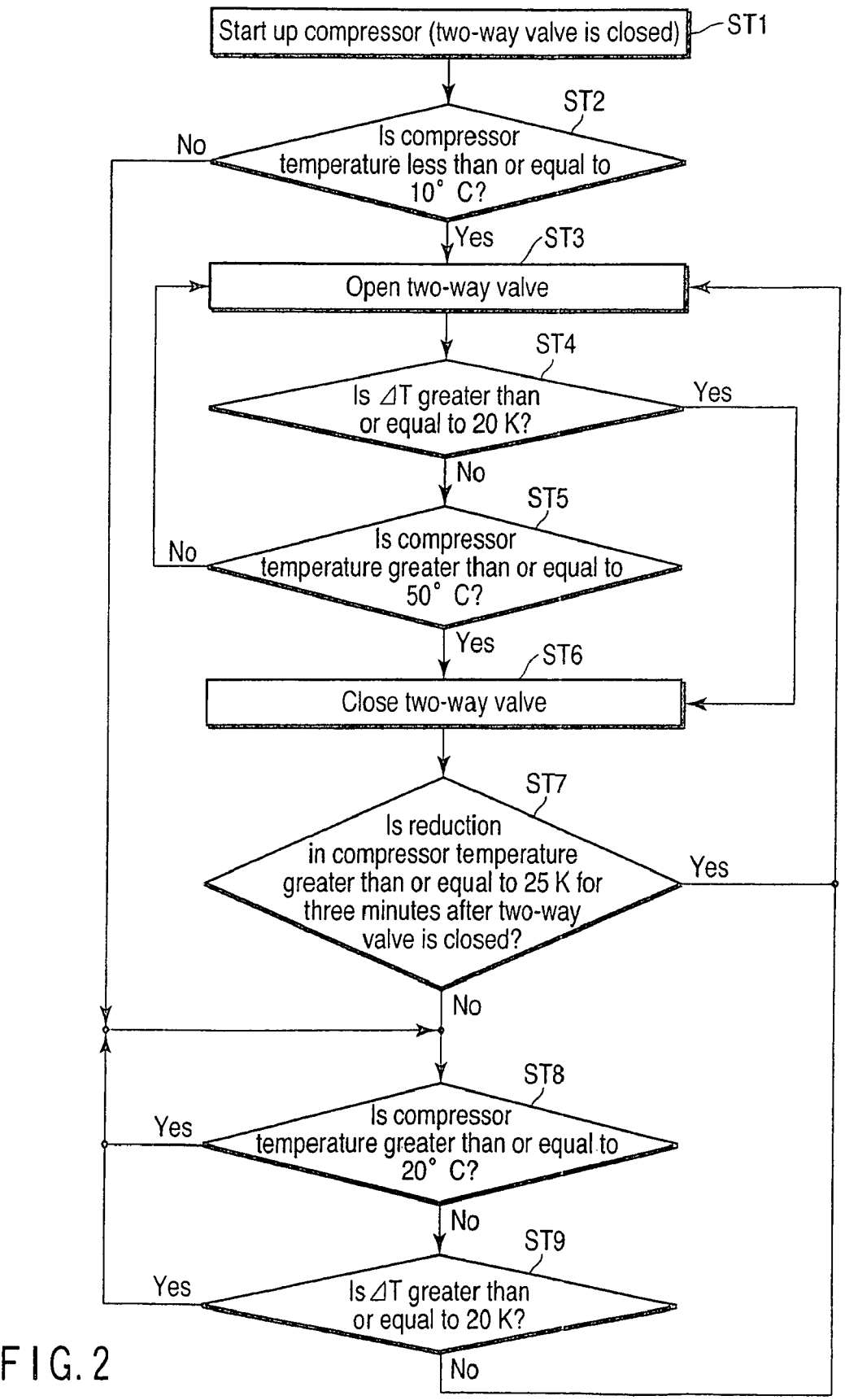
FIG. 2 is a flowchart illustrating a control process of the air conditioner.
Figure 3:
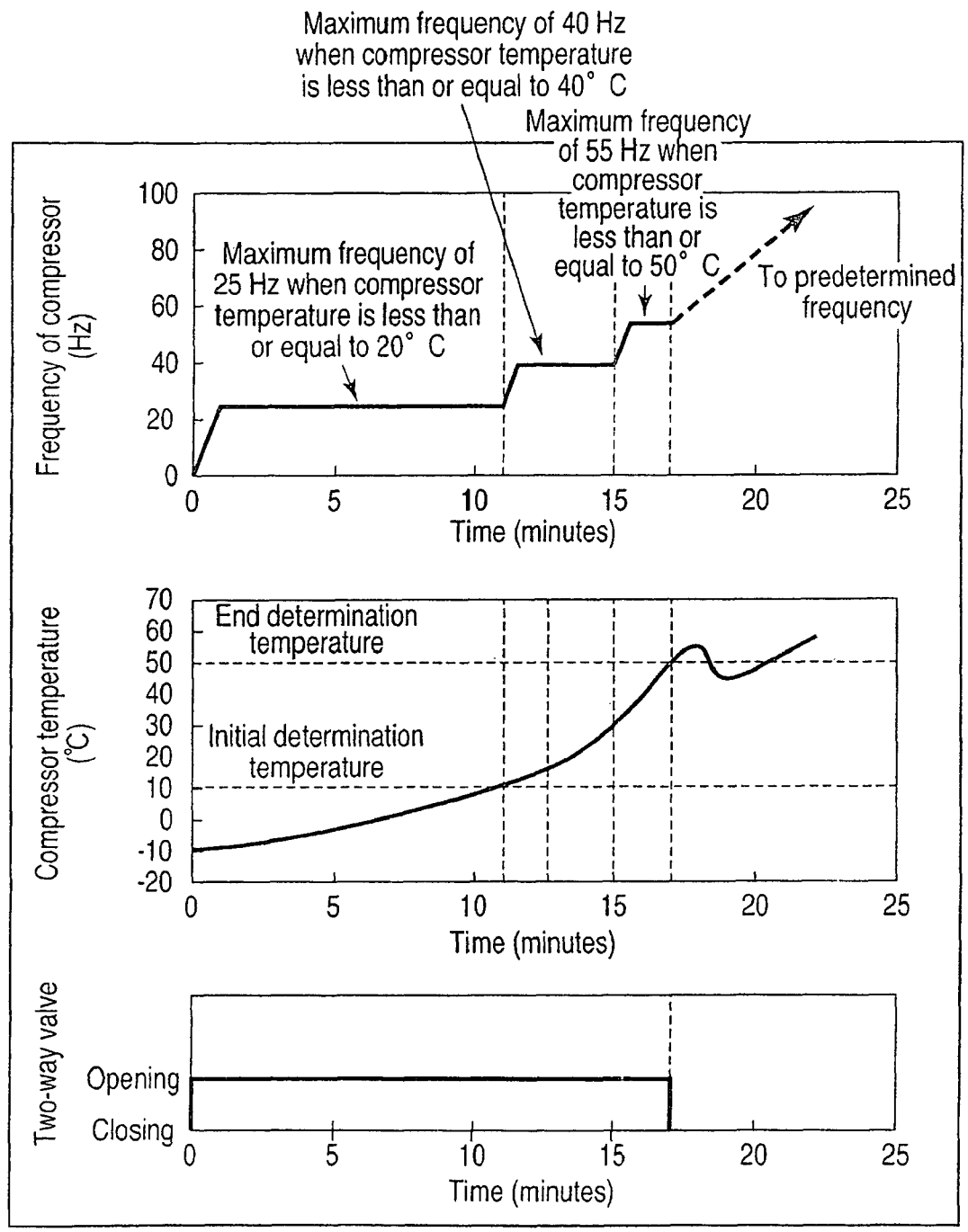
FIG. 3 is a timing chart illustrating the operating frequency of a compressor, a compressor temperature, and the opening/closing timing of a two-way valve in a method of controlling the air conditioner.

FIG. 1 is a block diagram illustrating the structure of an air conditioner 10 according to a first embodiment of the invention. FIG. 2 is a flowchart illustrating a control process of the air conditioner. FIG. 3 is a timing chart illustrating the operating frequency of a compressor 21, a compressor temperature, and the opening/closing timing of a two-way valve 4.

The air conditioner 10 includes an outdoor unit 20, an indoor unit 50, and connection pipes 60 and 61 that connect the indoor and outdoor units.

The outdoor unit 20 includes the compressor 21 of a high-pressure and variable speed type, an outdoor heat exchanger 23 that is connected to a discharge pipe 21a of the compressor 21 through a four-way valve 22, and a decompression device 24 that is connected to an outlet of the outdoor heat exchanger 23 in a case. An outlet of the decompression device 24 is connected to an inlet of an indoor heat exchanger 51 of the indoor unit 50 through the connection pipe 60.

An accumulator 25 is connected to a suction pipe 21b of the compressor 21. A blower fan 23a is provided adjacent to the outdoor heat exchanger 23.

A discharge pressure sensor 27, and a discharge temperature sensor 28 are attached to the discharge pipe 21a of the compressor 21.

The connection pipe 61 is connected to an inlet of the accumulator 25 through the four-way valve 22. The connection pipe 61 is connected to an outlet of the indoor heat exchanger 51 of the indoor unit 50.

The suction pipe 21b and the discharge pipe 21a are connected to each other by a bypass pipe 30, and the bypass pipe is opened or closed by the two-way valve 31.

A controller 40 is provided in the outdoor unit 20. The controller 40 controls the driving of the compressor 21, the driving of the blower fan 23a, the switching of the four-way valve 22, and the opening/closing of the two-way valve 31, on the basis of, for example, the output values of the discharge pressure sensor 27 and the discharge temperature sensor 28.

The indoor unit 50 includes the indoor heat exchanger 51 and a blower fan 51a. The connection pipe 60 is connected to an inlet of the indoor heat exchanger 51, and the connection pipe 61 is connected to an outlet thereof.

The compressor 21, the outdoor heat exchanger 23, the decompression device 24, the indoor heat exchanger 51, and the accumulator 25 are connected to each other in a ring shape to form a heat-pump-type refrigerator cycle.

The air conditioner 10 having the above-mentioned structure is operated as follows. As shown in FIG. 2, when the compressor 21 starts (ST1), the output value of the discharge temperature sensor 28 is input to the controller 40, and the controller 40 determines whether a compressor temperature is less than or equal to a first determination temperature (hereinafter, referred to as an initial determination temperature which is, for example, 10° C.) (ST2). If it is determined that the compressor temperature is less than or equal to an initial determination temperature of 10° C., the two-way valve 31 is opened (ST3). If it is determined that the compressor temperature is greater than 10° C., the process proceeds to Step ST8.

When the two-way valve 31 is opened, the control unit determines whether a temperature difference ΔT between the compressor temperature and the saturated temperature of a refrigerant corresponding to the output of the discharge pressure sensor 27 is greater than or equal to a predetermined value (for example, 20K) (ST4). If it is determined that the temperature difference ΔT is greater than or equal to 20K, the two-way valve 31 is closed (ST6). If it is determined that the temperature difference ΔT is less than 20K, it is determined whether the compressor temperature is greater than or equal to a second determination temperature (hereinafter, referred to as an end determination temperature which is, for example, 50° C.) (ST5). If it is determined that the compressor temperature is greater than or equal to an end determination temperature of 50° C., the two-way valve 31 is closed (ST6). If it is determined that the compressor temperature is less than the end determination temperature of 50° C., the two-way valve 31 is kept open.

When the two-way valve 31 is closed in Step ST6, it is determined whether the amount of reduction in compressor temperature after a predetermined time (for example, 3 minutes) has elapsed since the closing of the two-way valve is greater than or equal to a predetermined value (for example, 25K) (ST7). If it is determined that the amount of reduction in compressor temperature is greater than or equal to 25K, the process returns to Step ST3 to open the two-way valve 31 again. If it is determined that the amount of reduction in compressor temperature is less than 25K, it is determined whether the compressor temperature is greater than or equal to a third determination temperature (hereinafter, referred to as a re-determination temperature which is, for example, 20° C.) (ST8). If it is determined that the compressor temperature is greater than or equal to a re-determination temperature of 20° C., the two-way valve 31 is kept closed. If it is determined that the compressor temperature is less than the re-determination temperature of 20° C., it is determined whether the temperature difference ΔT is greater than or equal to a predetermined value (for example, 20K) (ST9). If it is determined that the temperature difference ΔT is greater than or equal to 20K, the two-way valve 31 is closed. If it is determined that the temperature difference ΔT is less than 20K, the process returns to Step ST3 to open the two-way valve 31 again.

Figure 4:
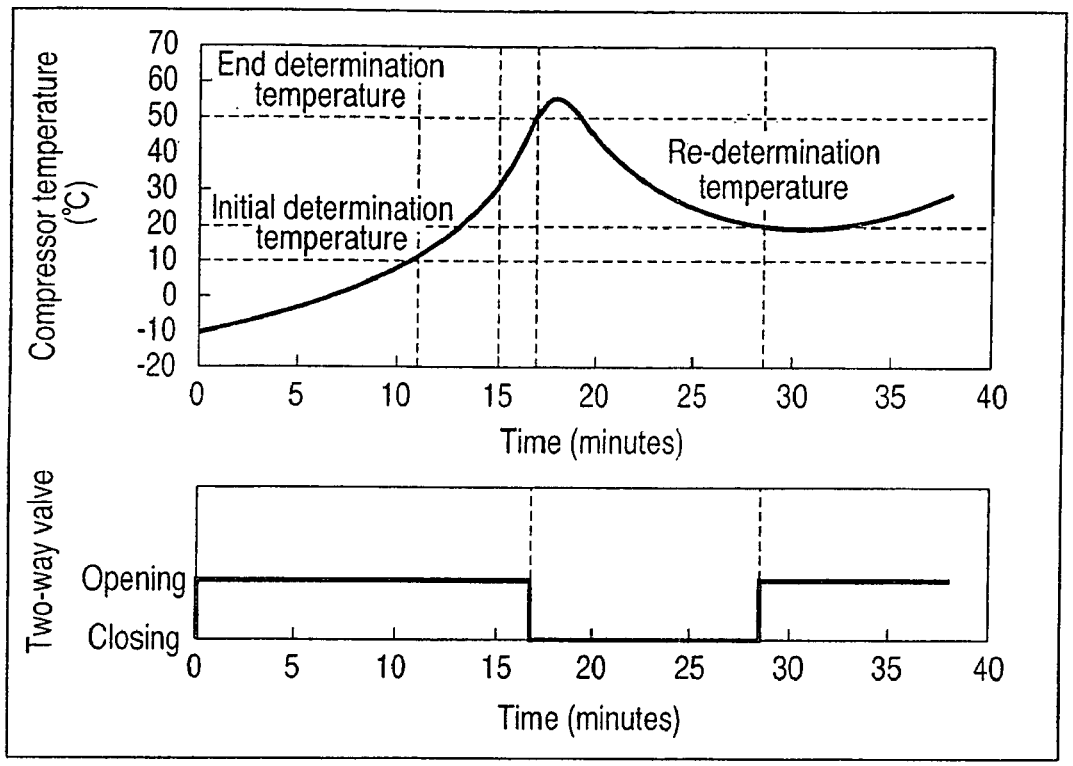
FIG. 4 is a timing chart illustrating the compressor temperature and the opening/closing timing of the two-way valve in the control method.
Figure 6:
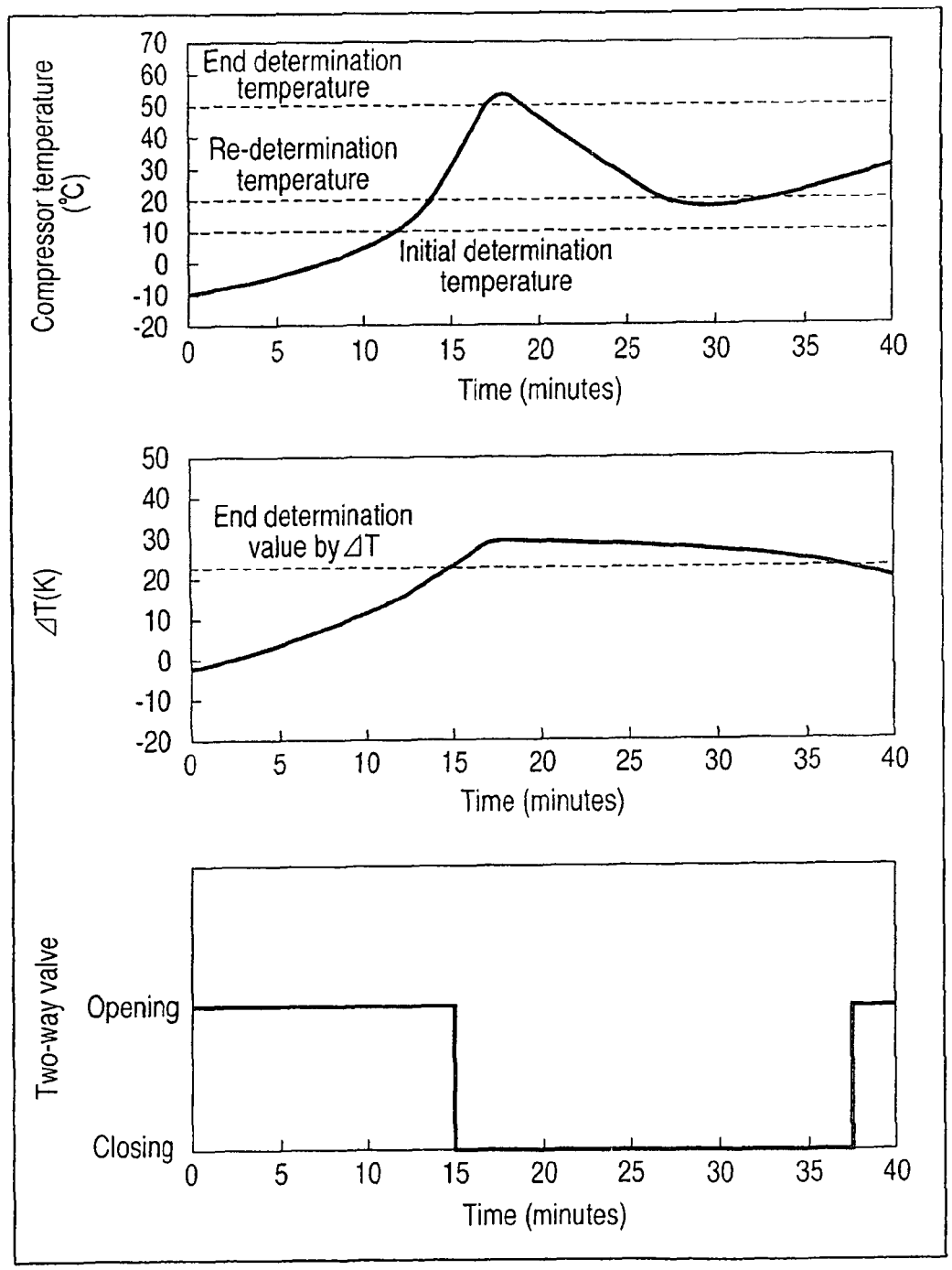
FIG. 6 is a timing chart illustrating the relationship between a compressor temperature, a temperature difference ΔT (compressor temperature-saturated vapor temperature corresponding to discharge pressure), and the opening/closing of a two-way valve in another method of controlling the air conditioner.

Next, the opening/closing operations of the two-way valve 31 and the driving of the compressor 21 will be described. FIG. 3 is a timing chart illustrating the operating frequency and the temperature of the compressor, and the opening/closing timing of the two-way valve when the operating frequency of the compressor 21 and the opening/closing operations of the two-way valve 31 are controlled on the basis of the compressor temperature. FIG. 4 is a timing chart illustrating the compressor temperature and the opening/closing timing of the two-way valve when the compressor temperature is reduced after the two-way valve 31 is closed. FIG. 6 is a timing chart illustrating the compressor temperature and the opening/closing timing of the two-way valve when the amount of reduction in compressor temperature is greater than or equal to a predetermined value.

As shown in FIG. 3, at the time of the startup of the compressor 21, the two-way valve 31 is opened since the compressor temperature is less than or equal to 10° C. Therefore, while the two-way valve 31 is being opened, a liquid refrigerant stored in the accumulator 25 does not return to the compressor.

When an oil temperature is gradually increased by compression, the operating frequency of the compressor is increased, and an increase in the oil temperature is accelerated. That is, as illustrated in FIG. 3, the operating frequency of the compressor may be increased gradually. That is, if the compressor temperature is less than or equal to 20° C., the compressor is operated at a maximum frequency of 25 Hz. If the compressor temperature is less than or equal to 40° C., the compressor is operated at a maximum frequency of 40 Hz. If the compressor temperature is less than or equal to 50° C., the compressor is operated at a maximum frequency of 55 Hz.

When the compressor temperature reaches a second determination temperature of 50° C., the dilution of a refrigerator oil is less likely to occur even when the liquid refrigerant stored in the accumulator 25 returns to the compressor 21. Therefore, the two-way valve 31 is closed, and the compressor 21 is operated at a predetermined frequency corresponding to a necessary indoor load (normal operation).

As described above, since the compressor is operated at a frequency corresponding to the compressor temperature, the refrigerant dissolved in the refrigerator oil is slowly discharged, and the refrigerator oil is slowly foamed. In addition, it is possible to rapidly increase the compressor temperature up to a sufficient temperature to remove the stagnation of the refrigerant.

As shown in FIG. 4, after the closing of the two-way valve 31, during the normal operation, when the refrigerant stored in the accumulator 25 flows into the compressor 21 and the compressor temperature is less than the re-determination temperature (20° C.), the two-way valve 31 is opened again and the compressor 21 is operated at a frequency corresponding to the compressor temperature.

As described above, even though an excessively large amount of refrigerant flows into the compressor 21 and the compressor temperature is reduced while the compressor is operated with the two-way valve 31 closed, it is possible to prevent the dilution of a refrigerator oil due to the inflow of the refrigerant and prevent the discharge of the refrigerator oil from the compressor 21 due to foaming by opening the two-way valve 31 and operating the compressor 31 at a frequency corresponding to the compressor temperature. In this embodiment, the re-determination temperature (20° C.) is set to be greater than the initial determination temperature (10° C.), thereby improving reliability. However, the re-determination temperature may be set to be equal to the initial determination temperature.

Figure 5:
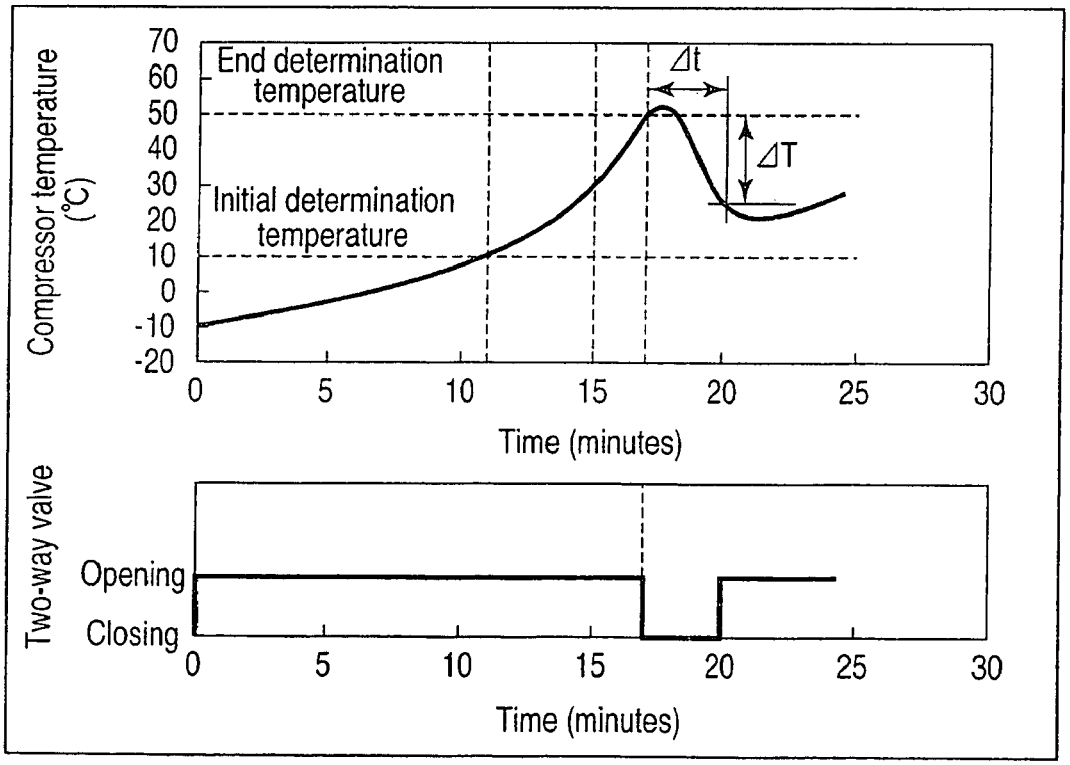
FIG. 5 is a timing chart illustrating the compressor temperature and the opening/closing timing of the two-way valve in the control method.

As shown in FIG. 5, when the compressor temperature is reduced by a predetermined value or more after a predetermined amount of time has elapsed since the closing of the two-way valve 31, it is estimated that a large amount of refrigerant is stored in the accumulator 25, and the two-way valve 31 is opened again before the compressor temperature is less than the re-determination temperature (20° C.). Specifically, when the compressor temperature is reduced by 25K or more three minutes after the two-way valve 31 is closed, the two-way valve 31 is opened again, and the compressor 21 is operated at a frequency corresponding to the compressor temperature.

In this way, even when the two-way valve 31 is closed with a large amount of refrigerant stored in the accumulator 25, it is possible to prevent rapid dilution of the refrigerator oil or the discharge of the refrigerator oil from the compressor 31 due to foaming.

Next, another method of controlling the opening/closing operations of the two-way valve and the driving of the compressor will be described. FIG. 6 is a timing chart illustrating the relationship between a compressor temperature, a temperature difference $\Delta T$ (compressor temperature-saturated vapor temperature corresponding to discharge pressure), and the opening/closing of the two-way valve in another method of controlling the opening/closing operations of the two-way valve and the driving of the compressor.

If a difference between the saturated temperature of a refrigerant corresponding to the output of the discharge pressure sensor 27 provided on the discharge side of the compressor 21 and the output value of the discharge temperature sensor 28 is greater than or equal to a predetermined value, the two-way valve 31 is closed. That is, if the degree of superheat of a discharge gas refrigerant is sufficiently high, the stagnation of the refrigerant has already been removed, and the dilution of a refrigerator oil does not occur even when the liquid refrigerant stored in the accumulator 25 flows into the compressor 21. Therefore, it is preferable to immediately close the two-way valve to perform the normal operation.

Specifically, if the temperature difference $\Delta T$ is more than 20K, it can be determined that the stagnation of the refrigerant is sufficiently removed and the stagnation does not occur even when the refrigerant stored in the accumulator 25 flows into the compressor 21. Therefore, the two-way valve is closed even though the compressor temperature does not reach an end determination temperature of 50° C.

According to the above-mentioned control method, it is possible to rapidly perform a normal operation while preventing the dilution of a refrigerator oil.

As shown in FIG. 6, even though the compressor temperature is less than or equal to the re-determination temperature after the two-way valve 31 is closed, the two-way valve 31 is kept closed if the temperature difference $\Delta T$ is greater than or equal to a predetermined value. That is, in the case in which the compressor temperature is reduced, but the degree of superheat of a discharge gas refrigerant is sufficient high, the dilution of the refrigerator oil does not occur even when the liquid refrigerant stored in the accumulator 25 flows into the compressor 21. Therefore, the normal operation is performed with the two-way valve closed.

Specifically, if the temperature difference $\Delta T$ is more than 20K, it can be determined that the stagnation of the refrigerant is sufficiently removed and the dilution of the refrigerator oil does not occur even when the liquid refrigerant stored in the accumulator 25 flows into the compressor 21. Therefore, the two-way valve is kept closed even when the compressor temperature reaches the re-determination temperature (20° C. or less). In this way, it is possible to continuously perform the normal operation while preventing the dilution of the refrigerator oil without closing the two-way valve.

Next, a second embodiment of the invention will be described.

Figure 7:
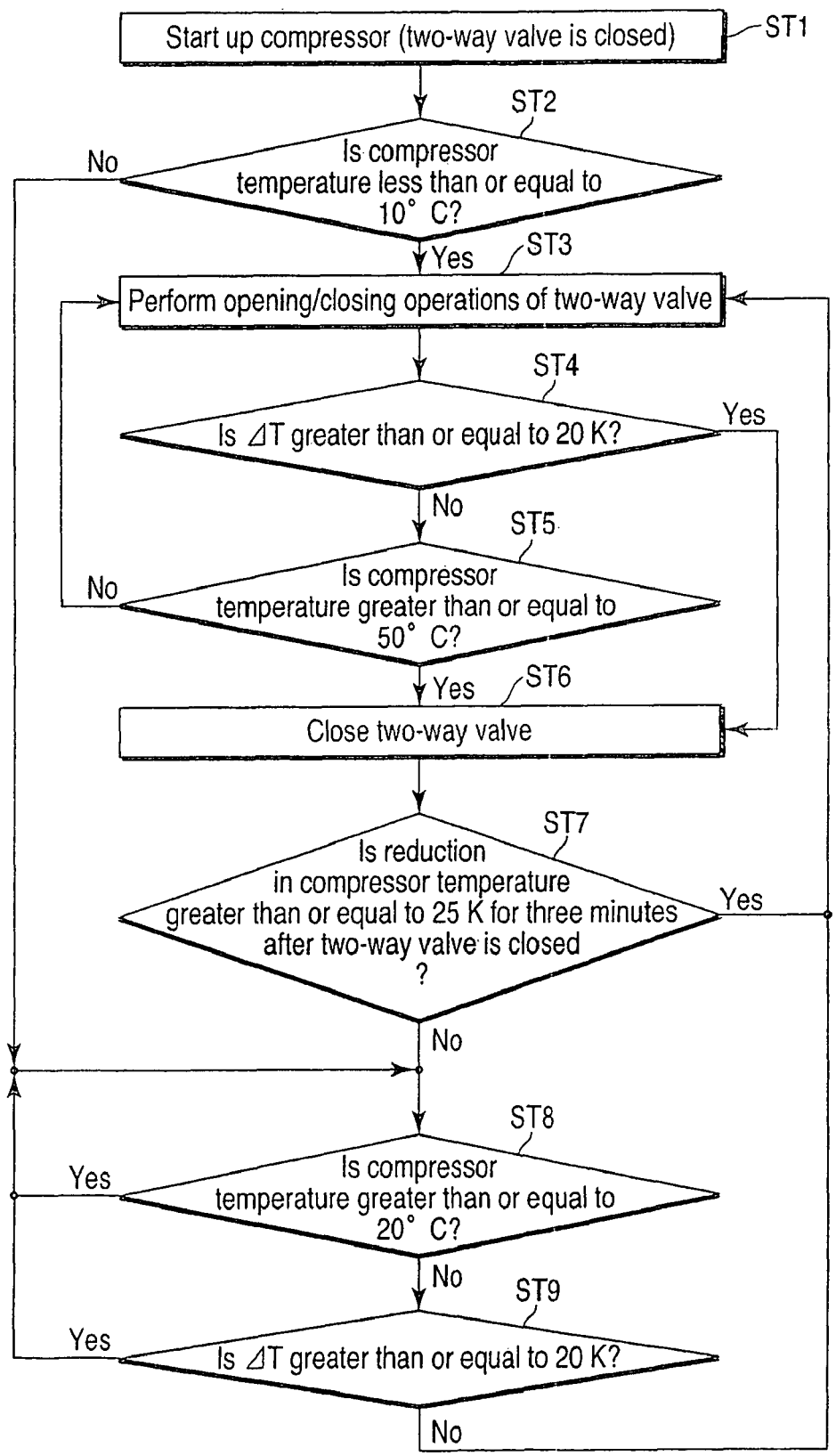
FIG. 7 is a flowchart illustrating a control process of an air conditioner according to a second embodiment of the invention.
Figure 8:
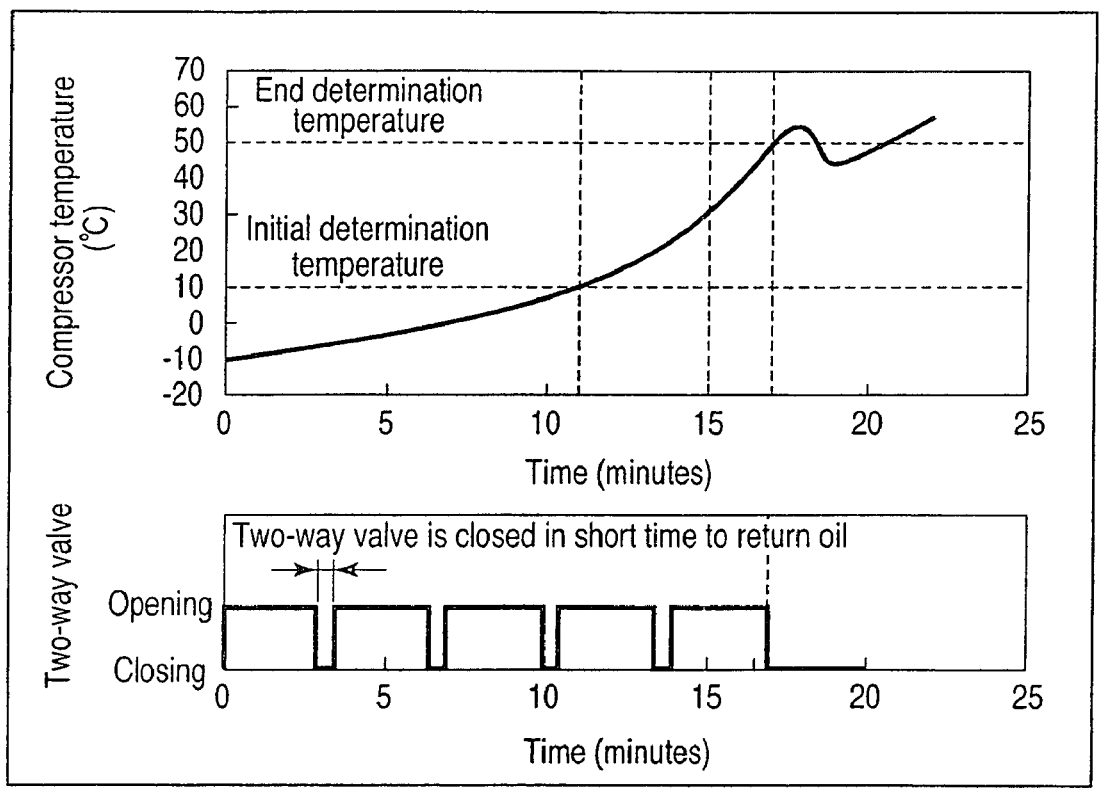
FIG. 8 is a timing chart illustrating a compressor temperature and the opening/closing timing of a two-way valve in a method of controlling the air conditioner.

FIG. 7 is a flowchart illustrating a control process according to this embodiment, and FIG. 8 is a timing chart illustrating the relationship between time, a compressor temperature, and the opening/closing operations of a two-way valve in a method of controlling the opening/closing operations of the two-way valve and the driving of a compressor according to the second embodiment. The second embodiment is similar to the first embodiment except that, in Step ST3 of FIG. 3, instead of opening the two-way valve 31, the two-way valve 31 is alternately opened and closed at a predetermined time interval. In the second embodiment, a description of the same components as those in the first embodiment will be omitted.

In this embodiment, the air conditioner 10 is operated as follows. As shown in FIG. 7, when the compressor 21 starts (ST1), the output value of the discharge temperature sensor 28 is input to the controller 40, and the controller 40 determines whether a compressor temperature is less than or equal to an initial determination temperature of 10° C. (ST2). If it is determined that the compressor temperature is less than or equal to 10° C., the two-way valve 31 is opened and closed (ST3). For example, the opening/closing operations of the two-way valve 31 are alternately performed at a time interval of 3 minutes and 20 seconds, and the two-way valve is closed for, for example, 5 seconds. If it is determined that the compressor temperature is greater than 10° C., the process proceeds to Step ST8.

When the opening/closing operations of the two-way valve are performed in Step ST3, the control unit determines whether a temperature difference $\Delta T$ between the compressor temperature and the saturated temperature of a refrigerant corresponding to the output of the discharge pressure sensor 27 is greater than or equal to 20K (ST4). If it is determined that the temperature difference $\Delta T$ is greater than or equal to 20K, the two-way valve 31 is closed (ST6). If it is determined that the temperature difference $\Delta T$ is less than 20K, it is determined whether the compressor temperature is greater than or equal to an end determination temperature of 50° C. (ST5). If it is determined that the compressor temperature is greater than or equal to 50° C., the two-way valve 31 is closed (ST6). If it is determined that the compressor temperature is less than 50° C., the opening/closing operations of the two-way valve 31 are continuously performed.

When the two-way valve 31 is closed in Step ST6, it is determined whether the amount of reduction in compressor temperature after 3 minutes have elapsed since the closing of the two-way valve is greater than or equal to 25K (ST7). If it is determined that the amount of reduction in compressor temperature is greater than or equal to 25K, the process returns to Step ST3 to perform the opening/closing operations of the two-way valve 31 again. If it is determined that the amount of reduction in compressor temperature is less than 25K, it is determined whether the compressor temperature is greater than or equal to a re-determination temperature of 20° C. (ST8). If it is determined that the compressor temperature is greater than or equal to 20° C., the two-way valve 31 is kept closed. If it is determined that the compressor temperature is less than 20° C., it is determined whether the temperature difference ΔT is greater than or equal to 20K (ST9). If it is determined that the temperature difference ΔT is greater than or equal to 20K, the two-way valve 31 remains closed. If it is determined that the temperature difference ΔT is less than 20K, the process returns to Step ST3 to perform the opening/closing operations of the two-way valve 31 again.

As shown in FIG. 8, at the time of the startup of the compressor 21, since the compressor temperature is less than or equal to an initial determination temperature of 10° C., the opening/closing operations of the two-way valve 31 are performed. The liquid refrigerant stored in the accumulator 25 flows into the compressor 21 in five seconds during which the two-way valve 31 is closed. However, the dilution of a refrigerator oil does not occur due to the liquid refrigerant flowing into the compressor 21 in a short time.

When an oil temperature is gradually increased by compression, the stagnation of the refrigerant is removed. If the compressor temperature is less than or equal to 20° C., the compressor is operated at a maximum frequency of 25 Hz. If the compressor temperature is less than or equal to 40° C., the compressor is operated at a maximum frequency of 40 Hz. If the compressor temperature is less than or equal to 50° C., the compressor is operated at a maximum frequency of 55 Hz In this way, an increase in the oil temperature is accelerated. Therefore, an appropriate amount of liquid refrigerant flows into the compressor in a short time when the two-way valve 31 is closed to reduce the liquid refrigerant stored in the accumulator 25.

When the compressor temperature reaches an end determination temperature of 50° C., the dilution of the refrigerator oil is less likely to occur even when the liquid refrigerant stored in the accumulator 25 flows into the compressor 21. Therefore, the two-way valve 31 is closed, and then the compressor 21 is operated at a predetermined frequency corresponding to a necessary indoor load (normal operation).

As described above, since the compressor is operated at a frequency corresponding to the compressor temperature, the refrigerant dissolved in the refrigerator oil is slowly discharged, and the refrigerator oil is slowly foamed. In addition, it is possible to rapidly increase the compressor temperature up to a sufficient temperature to remove the stagnation of the refrigerant.

In addition, when the two-way valve 31 is opened, the compressor temperature is increased while preventing the inflow of the liquid refrigerant from the accumulator 25 to the compressor 21. When the two-way valve 31 is closed, an appropriate amount of liquid refrigerant flows into the compressor. In this way, it is possible to reduce the liquid level of the refrigerant in the accumulator 25. As a result, it is possible to prevent a decrease in the compressor temperature and the dilution of a refrigerator oil due to the inflow of a large amount of liquid refrigerant when the opening or closing operation of the two-way valve ends.

While the two-way valve 31 is repeatedly opened and closed, the controller 40 may determine the opening and closing times of the two-way valve 31 such that the temperature detected by the discharge temperature sensor 28 is increased. While the two-way valve 31 is opened, the compressor temperature is increased by compression since the inflow of the liquid refrigerant from the accumulator 25 is prevented. While the two-way valve 31 is closed, the compressor temperature is decreased due to the inflow of the liquid refrigerant from the accumulator 25. However, the opening and closing times of the two-way valve are set such that the compressor temperature is generally increased.

As such, during the opening/closing operations of the two-way valve, it is possible to reduce the amount of liquid refrigerant in the accumulator 25 while increasing the compressor temperature. In addition, when the stagnation of the refrigerant is removed and the two-way valve 31 is closed after the opening/closing operations, it is possible to prevent the inflow of a large amount of liquid refrigerant to the compressor.

The invention is not limited to the above-described embodiments. For example, in the above-described embodiments, the discharge temperature sensor 28 attached to the compressor discharge pipe 21a is used to detect the compressor temperature, thereby reducing manufacturing costs. However, the compressor temperature sensor 26 that is directly mounted on the compressor may be used to detect compressor temperature. It should be understood by those skilled in the art that various modifications and changes of the invention can be made without departing from the scope and spirit of the invention.

What is claimed is:

1. An air conditioner comprising:
a variable speed compressor;
a four-way valve;
an outdoor heat exchanger;
a decompression device;
an indoor heat exchanger;
an accumulator;
a bypass pipe which connects a discharge side of the compressor and an outlet of the accumulator and has a two-way valve therein;
a compressor temperature sensor constructed and arranged to detect a temperature of the compressor; and
a controller constructed and arranged to open the two-way valve and charge the maximum operating frequency of the compressor on the basis of the temperature detected by the compressor temperature sensor when the temperature detected by the compressor temperature sensor is less than or equal to a first determination temperature at the time of the startup of the compressor after the air conditioner is operated, and close the two-way valve when the temperature detected by the compressor temperature sensor is greater than or equal to a second determination temperature,
wherein the variable speed compressor, the four-way valve, the outdoor heat exchanger, the decompression device, the indoor heat exchanger, and the accumulator are connected to one another in a ring shape, and
wherein, when the temperature detected by the compressor temperature sensor is greater than or equal to the second determination temperature, the two-way valve is closed, and
when the amount of reduction in the detected temperature is more than a predetermined value after a predetermined time has elapsed since the closing of the two-way valve, the two-way valve is opened until the temperature of the compressor is greater than or equal to the second determination temperature again.

2. An air conditioner comprising:
a variable speed compressor;
a four-way valve;
an outdoor heat exchanger;
a decompression device;
an indoor heat exchanger;
an accumulator;
a bypass pipe which connects a discharge side of the compressor and an outlet of the accumulator and has a two-way valve therein;

a compressor temperature sensor constructed and arranged to detect a temperature of the compressor;
pressure sensor constructed and arranged to detect the pressure of the discharge side of the compressor; and
a controller constructed and arranged to open the two-way valve and charge the maximum operating frequency of the compressor on the basis of the temperature detected by the compressor temperature sensor when the temperature detected by the compressor temperature sensor is less than or equal to a first determination temperature at the time of the startup of the compressor after the air conditioner is operated, and close the two-way valve when the temperature detected by the compressor temperature sensor is greater than or equal to a second determination temperature,
wherein the variable speed compressor, the four-way valve, the outdoor heat exchanger, the decompression device, the indoor heat exchanger, and the accumulator are connected to one another in a ring shape, and
wherein, when a difference between the temperature detected by the compressor temperature sensor and the saturated temperature of a refrigerant corresponding to the output of the pressure sensor is greater than or equal to a predetermined value with the two-way valve opened, the two-way valve is closed.

3. The air conditioner according to claim 2, wherein, when the difference between the temperature detected by the compressor temperature sensor and the saturated temperature of the refrigerant corresponding to the output of the pressure sensor is greater than or equal to the predetermined value, the two-way valve is closed even when the temperature detected by the compressor temperature sensor is less than or equal to the third determination temperature.

4. An air conditioner comprising:
a variable speed compressor;
a four-way valve;
an outdoor heat exchanger;
a decompression device;
an indoor heat exchanger;
an accumulator;
a bypass pipe which connects a discharge side of the compressor and an outlet of the accumulator and has a two-way valve therein;
a compressor temperature sensor constructed and arranged to detect a temperature of the compressor; and
a controller constructed and arranged to open the two-way valve and charge the maximum operating frequency of the compressor on the basis of the temperature detected by the compressor temperature sensor when the temperature detected by the compressor temperature sensor is less than or equal to a first determination temperature at the time of the startup of the compressor after the air conditioner is operated, and close the two-way valve when the temperature detected by the compressor temperature sensor is greater than or equal to a second determination temperature,
wherein the variable speed compressor, the four-way valve, the outdoor heat exchanger, the decompression device, the indoor heat exchanger, and the accumulator are connected to one another in a ring shape, and
wherein, when the two-way valve is opened since the temperature detected by the compressor temperature sensor is less than or equal to the first determination temperature at the time of the startup of the compressor after the air conditioner is operated, the two-way valve is opened and closed at a predetermined time interval, and is closed for a predetermined amount of time until the temperature detected by the compressor temperature sensor is greater than or equal to the second determination temperature.

* * * * *